(12) United States Patent
Tiyyagura et al.

(10) Patent No.: US 9,098,270 B1
(45) Date of Patent: Aug. 4, 2015

(54) DEVICE AND METHOD OF ESTABLISHING SLEEP MODE ARCHITECTURE FOR NVSRAMS

(75) Inventors: Srikanth_Reddy Tiyyagura, Bangalore (IN); David Still, Colorado Springs, CO (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 818 days.

(21) Appl. No.: 13/340,453

(22) Filed: Dec. 29, 2011

Related U.S. Application Data

(60) Provisional application No. 61/554,373, filed on Nov. 1, 2011.

(51) Int. Cl.
 *G06F 1/32* (2006.01)
(52) U.S. Cl.
 CPC ........................................ *G06F 1/32* (2013.01)
(58) Field of Classification Search
 CPC ........................................................ G06F 1/32
 USPC ......................................................... 713/323
 See application file for complete search history.

(56) References Cited

U.S. PATENT DOCUMENTS

| | | | |
|---|---|---|---|
| 4,860,228 A | 8/1989 | Carroll | |
| 5,309,563 A | 5/1994 | Farrand et al. | |
| 5,799,200 A | 8/1998 | Brant et al. | |
| 6,098,117 A | 8/2000 | Foote et al. | |
| RE37,418 E * | 10/2001 | Tindell et al. | 715/202 |
| 6,516,366 B1 | 2/2003 | Gates et al. | |
| 6,631,478 B1 | 10/2003 | Wang et al. | |
| 7,310,711 B2 | 12/2007 | New et al. | |
| 2004/0049655 A1 * | 3/2004 | Allison | 712/200 |
| 2005/0055594 A1 * | 3/2005 | Doering et al. | 713/375 |
| 2007/0101174 A1 * | 5/2007 | Tsukimori et al. | 713/300 |
| 2008/0172667 A1 * | 7/2008 | Inoue et al. | 718/100 |
| 2008/0263318 A1 * | 10/2008 | May et al. | 712/23 |
| 2009/0059951 A1 * | 3/2009 | Hayashi | 370/458 |
| 2009/0189639 A1 | 7/2009 | Wingen | |
| 2010/0314452 A1 * | 12/2010 | Yeo et al. | 235/492 |

FOREIGN PATENT DOCUMENTS

WO 9922296 A2 5/1999

OTHER PUBLICATIONS

Ghoneima, et al., "Low Power Prediction Based Data Transfer Architecture," IEEE 2005 Custom Integrated Circuits Conference, pp. 313-316 ; 4 pages.

* cited by examiner

*Primary Examiner* — Mohammed Rehman

(57) ABSTRACT

A device is configured to establish first and second device power domains. Isolation circuits isolate signals from passing between circuits in the first device power domain and circuits in the second device power domain. During a transition between power domains, an n-bit value is stored in a particular storage location, and compared to a particular n-bit value. Isolation between the first and second device power domains is removed when the n-bit value stored in the particular storage location matches the particular n-bit value.

18 Claims, 4 Drawing Sheets

DEVICE AND METHOD OF ESTABLISHING SLEEP MODE ARCHITECTURE FOR NVSRAMS

PRIORITY

This application claims priority under 35 U.S.C. 119 to USA provisional application no. 61/554,373 filed on Nov. 1, 2011, which is incorporated herein by reference in its entirety.

BACKGROUND

FIG. 1 illustrates different power modes for a data processing device. When an external power supply (VCCX) is available, the device operates in Normal power mode. In Normal power mode, all circuit blocks are powered and their inputs and outputs are well defined. Thus, the Normal power domain comprises all circuit blocks in the drawing. Auto-Store power mode is entered when VCCX (external power supply) drops below a specified threshold. In Auto-Store power mode, device power is derived from a backup supply (VCAP) utilizing one or more capacitors. In Auto-Store mode, circuit blocks powered by VCCX (blocks within dashed line boundaries in FIG. 1) have undefined outputs. This includes most if not all I/O circuits 102 of the device. Thus, the Auto-Store power domain comprises all circuit blocks not within dashed boundaries in the drawing, including microcontroller (uC 110), memory 108, isolation block 104, and power supply switch 107. In Auto-Store power mode, signals crossing from the Normal power domain into the Auto-Store power domain are isolated by a control signal to the isolation block 104, the signal generated by the power supply switch 107. The power switch 107 monitors VCCX and generates the control signal based on whether VCCX is above or below a specified threshold. The control signal is applied to isolation block 104 to isolate signals crossing from the Normal to the Auto-Store power domains.

A third power mode, called Sleep power mode, involves putting the device into a very low power consumption state. In Sleep power mode, all circuit blocks except those required for 'waking up' (transitioning out of Sleep power mode) are unpowered. VCCX powers the few circuit blocks needed to wake up from Sleep power mode.

In order to implement a Sleep power mode in a device including both Normal and Auto-Store power modes, there must exist a mechanism to reliably transition out of Sleep power mode. However, in some devices, such as those utilizing low power nvSRAMs (non-volatile static random access memories), there are no circuits which can be relied upon to power the data retention and isolation blocks between power domains while waking up from Sleep mode, in the event VCCX fails during wakeup before VCAP is sufficiently charged.

In the following description, examples are used that include nvSRAMs. Although useful to devices including nvSRAMs, the logic and techniques described herein are not limited to such devices.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
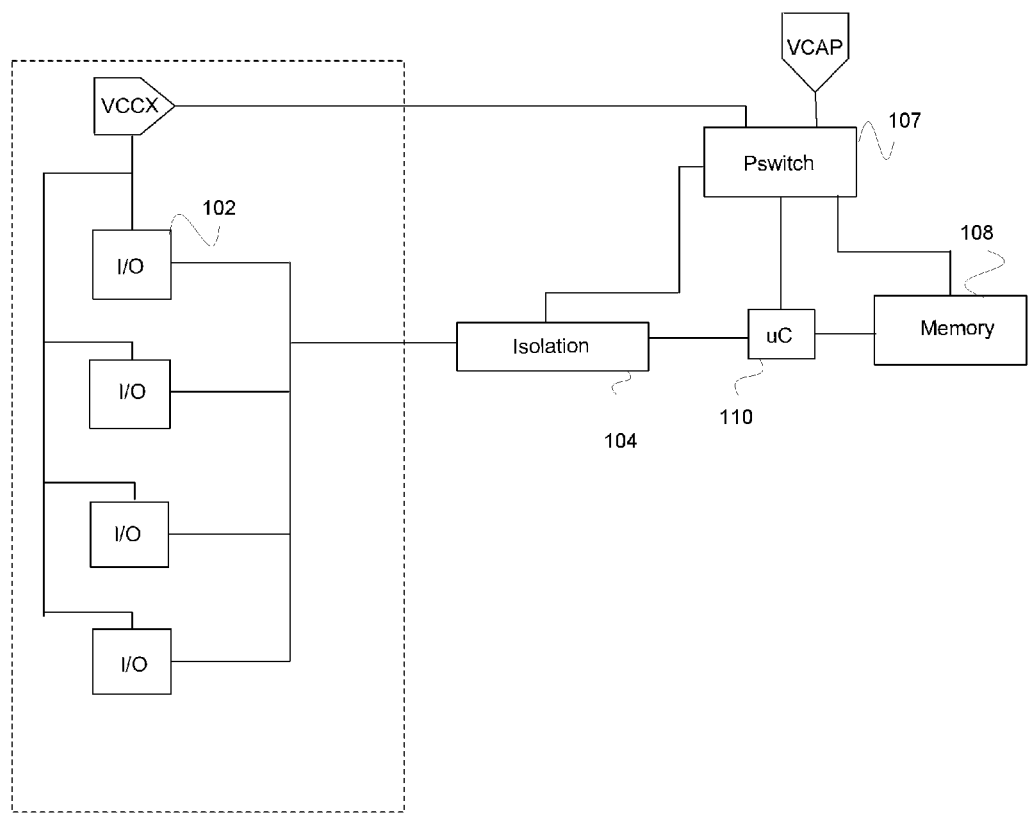
FIG. 1 illustrates an exemplary device having Normal and Auto-Store power domains.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

In the drawings and description, various power domains are described or drawn including certain logic blocks. Beyond these examples, different devices may have different logic blocks, or additional logic blocks, included in the various power domains.

Herein, reference to a "particular" storage location means a storage location particularly reserved for the purpose for which it is referenced, from among a plurality of available storage locations in the device or circuit. Reference to a "particular" value means the value is unique or unique to a limited set of values, and that other values which aren't the "particular" value will not have the recited effects of the particular value.

DESCRIPTION OF EXEMPLARY EMBODIMENTS

The following descriptions refer to certain implementation-specific power modes, namely, Normal, Auto-Store, and Sleep power modes. In general, these power modes may be considered as Mode 1, Mode 2, and Mode 3. In other words, the invention is applicable more generally to controlling signaling between multiple power domains, either in a particular direction, or bi-directionally.

Figure 2:
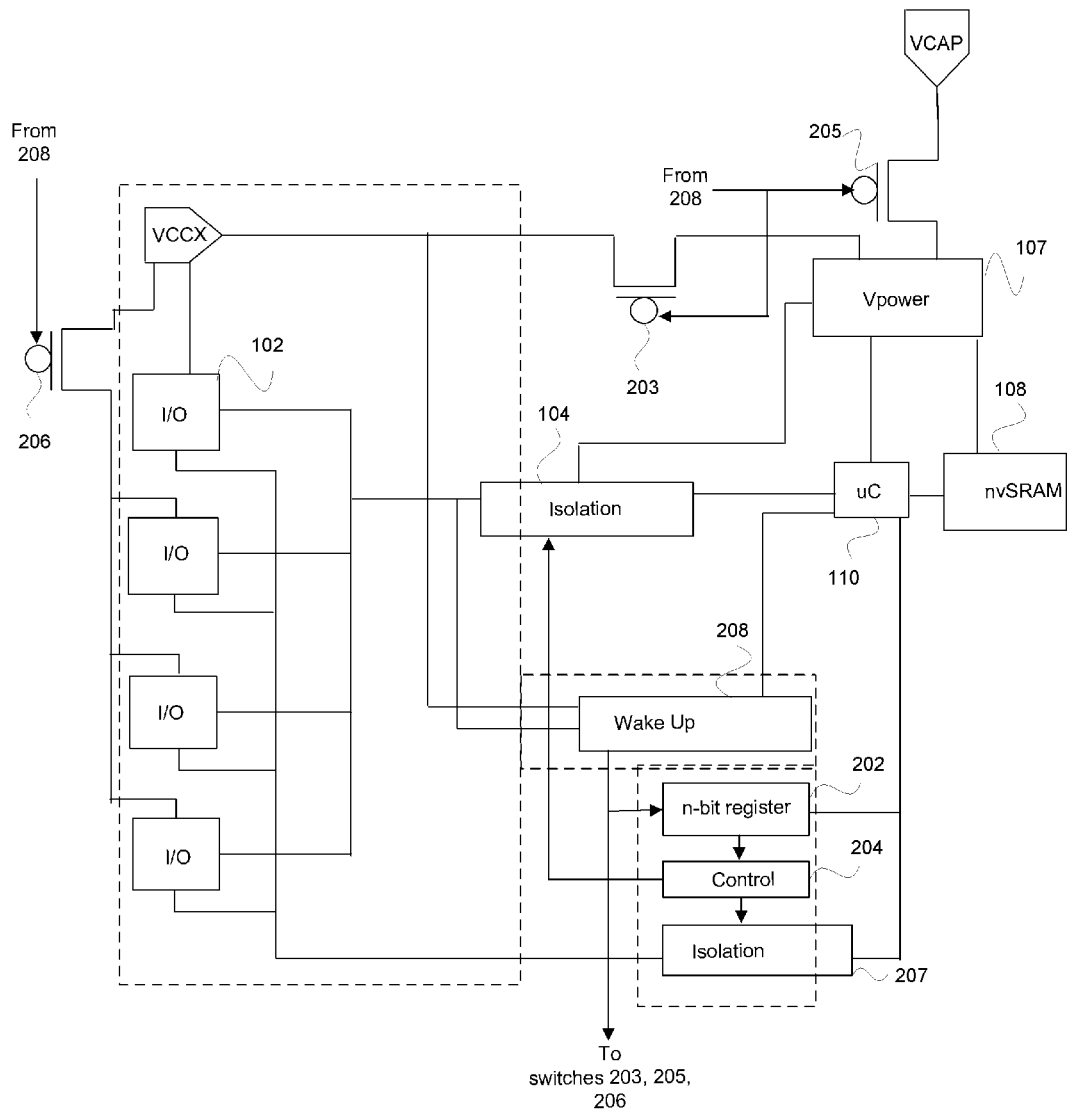
FIG. 2 illustrates an exemplary nvSRAM device having Normal, Auto-Store, and Sleep power domains.

FIG. 2 illustrates an nvSRAM device having Normal, Auto-Store, and Sleep power domains. The device comprises an N-bit semaphore (where N is greater than 1) to control signals that cross to and from the Normal and Auto-Store power domains. All blocks are powered in Normal power mode. In Auto-Store mode, the blocks inside the dotted boundaries are unpowered. In Sleep Mode, all circuit blocks are unpowered, except for certain I/O blocks and the wakeup logic 208. The wakeup logic 208 comprises logic to detect a 'wake up' event (e.g., certain I/O activity) and to transition the device from Sleep Mode to Normal mode (i.e., to 'wake up' the device). In Normal and Auto-Store modes, the wakeup logic 208 is unpowered.

When the wakeup logic is powered, the device transitions into Sleep power mode. The wakeup logic 208 resets the contents of register 202. The wakeup logic 208 operates switches 204, 205, and 206 to disconnect both the primary power source VCCX and the backup power source VCAP, thus unpowering most circuits in the device.

The Normal power domain and the Auto-Store power domain are isolated from one another through isolation logic 104, 207 operated by control logic 204. The control logic 204 operates the isolation logic 104, 207 to allow signals to pass between the Normal power domain and the Auto-Store power domain if and only if the register 202 stores a particular n-bit value. This value is referred to herein as the 'wakeup semaphore'. The wakeup semaphore value is persistently stored by or for use by the control logic 204 (it persists even when control logic 204 is unpowered). The wakeup semaphore is stored into an n-bit register 202 by the microcontroller 110 during the transition from Sleep mode to Normal mode (the wakeup process).

The control logic 204 provides a signal to the isolation logic 104, 207 to open or close the data paths between the Normal power domain and the Auto-Store power domain. When the control logic 204 is unpowered, the signal generated by control logic 204 is in an undefined state (e.g., can be digital 'High' or digital low' or anywhere between High and Low). The control signal is undefined and is not actively driven (due to lack of power supply) and can end up in a state where it enables the data paths between the power domains. This may cause 'garbage data' (undefined or erroneous data values) to pass between the power domains.

The same risk exists of garbage data getting loaded into register 202. However, the semaphore is set to a multi-bit value having a low probability (e.g., less than 1:1000, or less than 1:10,000, or less than 1:100,000) of exactly matching a random or pseudo-random garbage value. The number and/or arrangement of bits in the semaphore can be modified to affect the probability of garbage data matching the required semaphore value based on the reliability requirement of particular application.

During the wakeup process, the wakeup logic 208 operates switches 203, 205, and 206 to restore power from VCCX and VCAP to the device circuits. The microcontroller 110 stores the wakeup semaphore in register 202 at or shortly after a point in the wakeup process when the Auto-Store power domain becomes valid. At this point, signals can safely pass between the Normal and Auto-Store power domains. During the wakeup process, the control logic 204 compares the value stored in the register 202 with the wakeup semaphore value on an ongoing basis. When the values match, the control logic 204 operates the isolation logic 104, 207 to allow signals to pass between the Normal power domain and the Auto-Store power domain.

This example involves using the wakeup semaphore to control the data path both into and out of the Auto-Store power domain (isolation 207 and isolation 104). In some designs, only the data path out of the Auto-Store power domain (isolation 207) is controlled this way. In general, the input and/or output boundaries between any combination of power domains may be singularly or simultaneously controlled using this technique.

The described example shows the usage of a programmable microcontroller 110 to load the wakeup semaphore into the register 202. Alternatively, state-machine logic may be used to control the loading of the wakeup semaphore into the register 202 when or after circuits in the Auto-Store power domain reach a state that makes possible safe interoperation with circuits in other power domains. A similar approach may be used in devices where circuit blocks operate from different power supplies and hence do not have a common power domain to control the data isolation at the interfaces of these circuit blocks.

Prior art implementations employ a standby power domain and standby power regulator which is 'always on' and which generates the enable/disable control signals to control the isolation between power domains. Designs employing the techniques and logic described herein need not rely upon a standby power domain and standby regulator.

Figure 3:
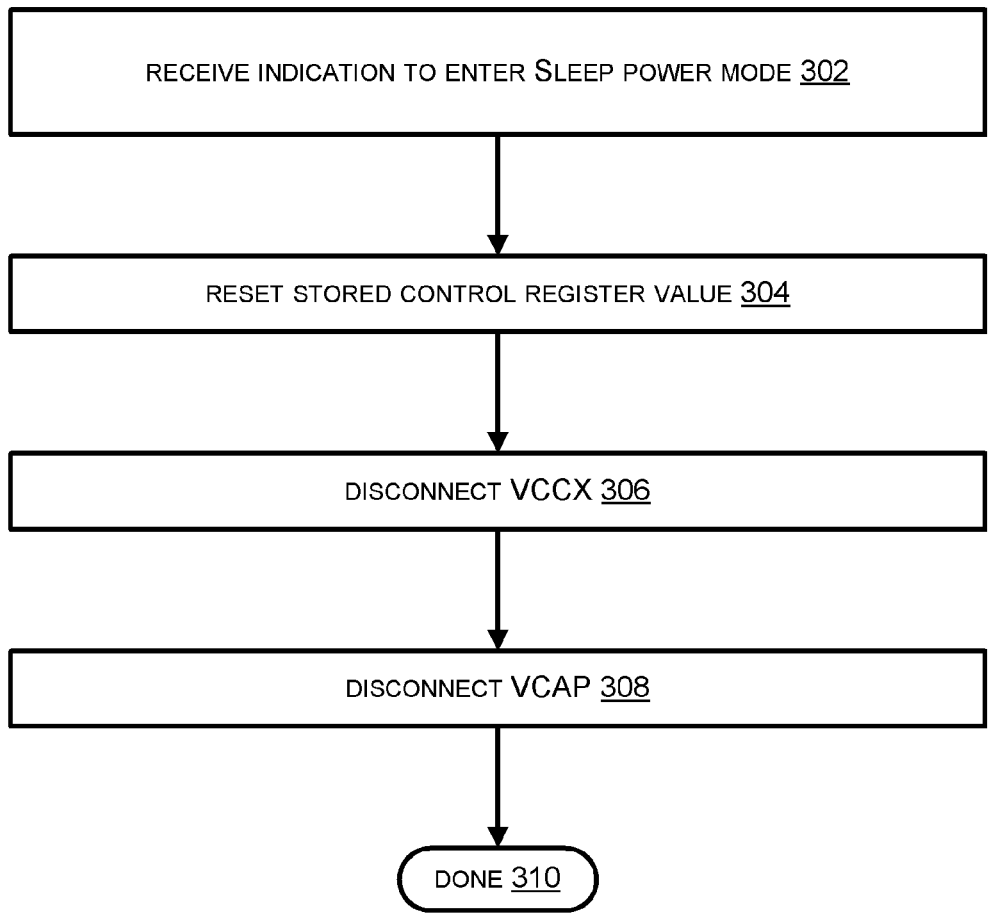
FIG. 3 is a flow chart illustrating an exemplary process for entering Sleep power mode.

FIG. 3 is a flow chart illustrating an exemplary process for entering Sleep power mode. Upon receipt of an indication to enter Sleep power mode (302), the stored value in the control register is reset (304). Power from VCCX (primary power) and VCAP (backup power) is disconnected from all device circuits (306, 308) except those needed to wake up from Sleep power mode, and the process concludes (310).

Figure 4:
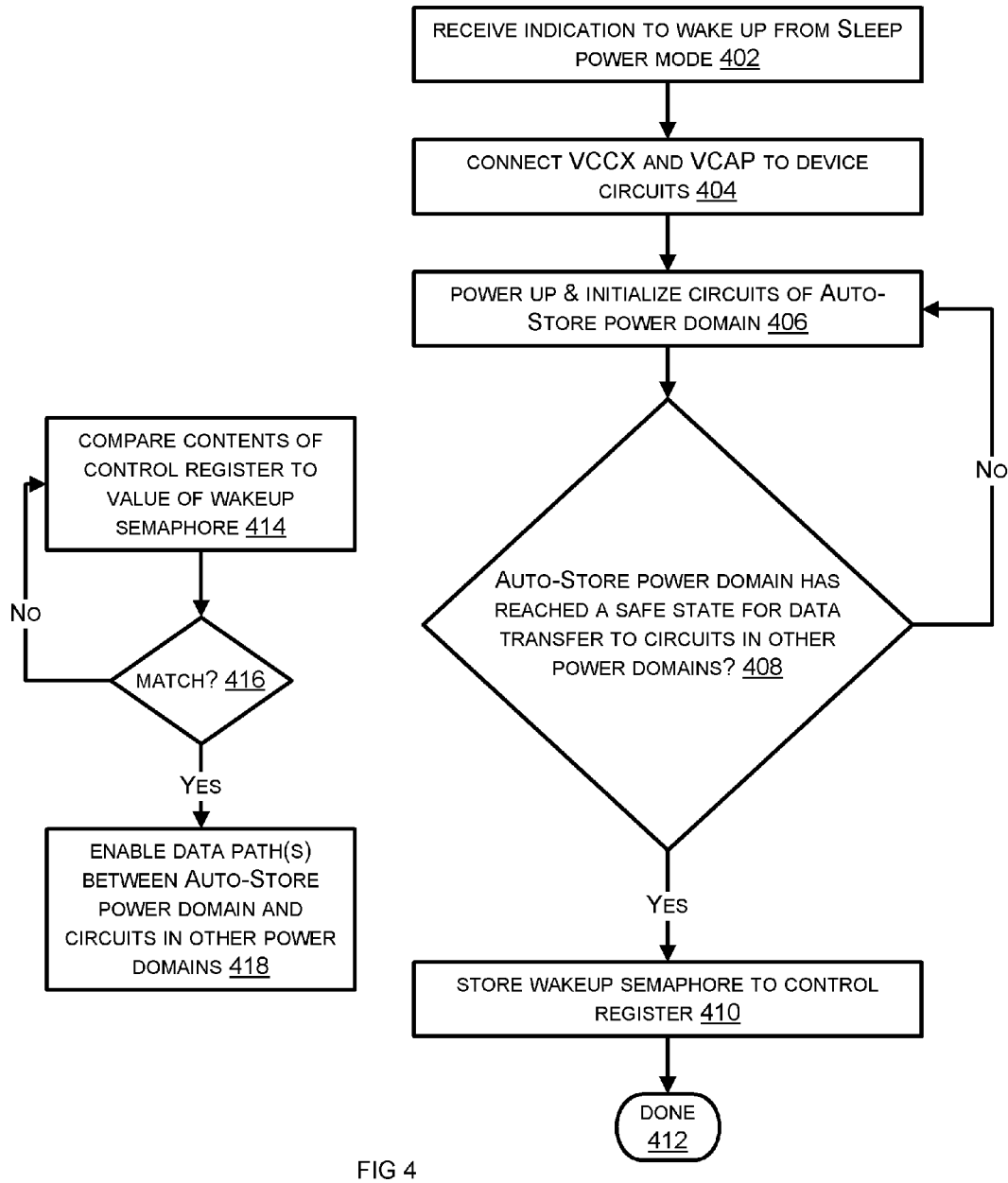
FIG. 4 is a flow chart illustrating an exemplary process for waking up from Sleep power mode.

FIG. 4 is a flow chart illustrating an exemplary process for waking up from Sleep power mode. An indication is received to wake up (402). VCCX and VCAP are connected to the device circuits (404). VCAP is made available, but is not used unless/until VCCX fails. Circuits of the Auto-Store power domain are powered on and initialized using VCCX (406). If the Auto-Store power domain has reached a state from which safe data transfer is possible to circuits in other power domains (408), the wakeup semaphore is written to the control register (410) and the process concludes (412).

Simultaneously with powering on and initializing circuits of the Auto-Store power domain, the contents of the control register are compared with the wakeup semaphore value (414). If there's a match (416), data path(s) are enabled between the Auto-Store power domain and circuits in other power domains (418).

Implementations and Alternatives

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method of operating a device alternatively in a normal power mode, an auto-store power mode and a sleep power mode, wherein the device is configured to be divided into a normal, an auto-store and a sleep power domains, the method comprising:
    receiving an indication at the sleep power domain to transition the device from the sleep power mode into the normal power mode;
    monitoring a state of the auto-store power domain during the transition;
    storing an n-bit semaphore value by a controller in a particular storage location in the auto-store power domain when the state of the auto-store power domain is such that reliable data transfer may take place to and from circuits outside of the auto-store power domain;
    monitoring contents of the particular storage location in an ongoing fashion, wherein the particular storage location is a register; and
    removing isolation for signals to and from the auto-store power domain.

2. The method of claim 1, further comprising:
    resetting contents of the particular storage location while transitioning into the sleep power mode from the normal or the auto-store power mode wherein an n-bit reset value different from the n-bit semaphore value is stored in the particular storage location.

3. The method of claim 1, further comprising:
    disconnecting both a primary and backup power sources from powering circuits in the normal and the auto-store power domains of the device when transitioning into the sleep power mode.

4. A method of operating a device in a normal power mode, an auto-store power mode and a sleep power mode selectively and alternatively, the method comprising:
    establishing a normal and an auto-store power domains in the device;
    isolating, using isolation logic, circuits in the normal power domain from circuits in the auto-store power domain;

storing, using a controller, an n-bit value in a particular storage location wherein n is greater than 1;
comparing, using control logic, the n-bit value stored in the particular storage location with a predetermined particular n-bit semaphore value; and
removing isolation, using the isolation logic, between the normal and the auto-store power domains when the n-bit value stored in the particular storage location matches the predetermined particular n-bit semaphore value.

5. The method of claim 4, further comprising:
removing one or more of inbound and outbound isolation between the auto-store power domain and the normal power domain when the n-bit value stored in the particular storage location matches the predetermined particular n-bit semaphore value.

6. The method of claim 5, further comprising:
establishing a
sleep power domain; and
disconnecting both primary and backup power sources from powering circuits in the normal and auto-store power domains of the device when transitioning into the Sleep power mode.

7. The method claim 4, further comprising:
causing the controller to load the predetermined particular n-bit semaphore value into the particular storage location when, during a transition from the Sleep power mode to the Normal power mode, the device auto-store power domain reaches a state in which data can be reliably transferred between circuits in the normal power domain and the device auto-store power domain.

8. The method of claim 4 wherein the particular storage location is a register, further comprising:
providing the n-bit value stored in the register to the control logic;
outputting a signal from the control logic to remove isolation for signals to and from the auto-store power domain when the n-bit value stored in the register matches the predetermined particular n-bit semaphore value.

9. The method of claim 4, further comprising:
storing an n-bit garbage value in the particular storage location when data transfer between the normal and the auto-store power domains is unreliable, the n-bit garbage value having a low probability of being equal to the predetermined particular n-bit semaphore value.

10. The method of claim 4, wherein the second device power domain includes at least one nvSRAM circuit.

11. A device configured to operate selectively and alternatively in a normal power mode, an auto-store power mode and a sleep power mode, the device comprising:
a first device power domain that is a normal power domain; and
a second device power domain that is an auto-store power domain, wherein the second device power domain includes:
at least one isolation logic configured to provide isolation between circuits in the first device power domain and circuits in the second device power domain,
a controller configured to store an n-bit value in a register logic,
a control logic configured to compare the n-bit value stored in the register logic with a particular n-bit semaphore value and control operation of the at least one isolation logic, wherein the isolation logic is to remove the isolation between the circuits of the first and second device power domains when the n-bit value stored in the register logic matches the particular n-bit semaphore value.

12. The device of claim 11, wherein:
the first and second device power domains are powered by a main power during the normal power mode, wherein the circuits in the first and the second device power domains are not isolated,
the second device power domain is powered by a back up power during the auto-store power mode when the main power supply drops below a power threshold, wherein the circuits in the first and the second device power domains are isolated, and
the second power domain and most of the circuits in the first power domain are unpowered during the sleep mode, wherein the circuits in the first and the second device power domains are isolated.

13. The device of claim 11, wherein the device further includes a third device power domain that is a sleep power domain, the third device power domain comprising:
a wake up logic which is only powered during the sleep power mode; and
selective circuits in the first device power domain, wherein the selective circuits are powered by the main power during the normal mode,
wherein the wake up logic and the selective circuits in the first device power domain are coupled and powered by at least one power source other than the main power and the back up power during the sleep mode.

14. The device of claim 13 during transition into the sleep power mode, wherein the wake up logic is powered and configured to:
store a n-bit reset value which is different from the particular n-bit semaphore value in the register logic; and
disconnect the first and second device power domains from the main and back up power.

15. The device of claim 13 during transition out of the sleep power mode, wherein the wake up logic is configured to restore connection between the first and second device power domains from the main and back up power to cause the controller to store the particular n-bit semaphore value in the register logic.

16. The device of claim 11, wherein the isolation between circuits in the first device power domain and circuits in the second device power domain is one-way.

17. The device of claim 11, wherein the isolation between circuits in the first device power domain and circuits in the second device power domain is two-way.

18. The device of claim 11, wherein the second device power domain further includes at least one non-volatile static random-access memory (nvSRAM) circuit coupled to the controller.

* * * * *